United States Patent
W Mustapa et al.

(10) Patent No.: US 9,993,768 B2
(45) Date of Patent: Jun. 12, 2018

(54) METHOD AND SYSTEM FOR REMOVING CARBON DIOXIDE FROM HYDROCARBONS

(71) Applicant: Petroliam Nasional Berhad (PETRONAS), Kuala Lumpur (MY)

(72) Inventors: W Nurul Ffazida W Mustapa, Kuala Lumpur (MY); M Hanif M Halim, Kuala Lumpur (MY); Farahdila Kadirkhan, Kuala Lumpur (MY); Azman Shafawi, Kuala Lumpur (MY); Athirah M Tamidi, Kuala Lumpur (MY)

(73) Assignee: Petroliam Nasional Berhad (PETRONAS), Kuala Lumpur (MY)

( * ) Notice: Subject to any disclaimer, the term of this patent is extended or adjusted under 35 U.S.C. 154(b) by 345 days.

(21) Appl. No.: 14/399,728

(22) PCT Filed: May 8, 2013

(86) PCT No.: PCT/MY2013/000093
§ 371 (c)(1),
(2) Date: Nov. 7, 2014

(87) PCT Pub. No.: WO2013/169093
PCT Pub. Date: Nov. 14, 2013

(65) Prior Publication Data
US 2015/0122122 A1    May 7, 2015

(30) Foreign Application Priority Data
May 8, 2012  (MY) .......................... PI 2012002024

(51) Int. Cl.
*B01D 53/22*    (2006.01)
*B01D 61/24*    (2006.01)
(Continued)

(52) U.S. Cl.
CPC ....... *B01D 53/229* (2013.01); *B01D 53/1475* (2013.01); *B01D 53/225* (2013.01);
(Continued)

(58) Field of Classification Search
CPC .................. B01D 53/229; B01D 53/1475; B01D 53/225; B01D 53/228; B01D 61/246;
(Continued)

(56) References Cited

U.S. PATENT DOCUMENTS 4,466,946 A * 8/1984 Goddin, Jr. ........ B01D 53/1412
                                                        208/289
5,411,721 A   5/1995 Doshi et al.
(Continued)

FOREIGN PATENT DOCUMENTS

CN   101301562 A   11/2008
CN   101909722 A   12/2010
(Continued)

OTHER PUBLICATIONS

International Search Report dated Aug. 26, 2013 for related PCT Patent Application No. PCT/MY2013/000093, which was filed May 8, 2013; 4 pages.
(Continued)

*Primary Examiner* — Anthony Shumate
(74) *Attorney, Agent, or Firm* — Hovey Williams LLP

(57) ABSTRACT

The present disclosure relates to a method for removing carbon dioxide from hydrocarbons, the method comprising the steps of: (a) contacting a feed stream comprising hydrocarbons and carbon dioxide with one or more gas-separation membranes to produce a hydrocarbon-rich retentate gas stream and a permeate gas stream rich in carbon dioxide, the retentate gas stream containing less carbon dioxide relative to the feed stream; and (b) passing at least one of the retentate gas stream or the permeate gas stream through an
(Continued)

absorption unit to produce a hydrocarbon-rich gas phase and a liquid absorbent phase containing said carbon dioxide. The present disclosure also relates to a system for doing the same.

18 Claims, 2 Drawing Sheets

(51) Int. Cl.
*B01D 53/14* (2006.01)
*C10L 3/10* (2006.01)

(52) U.S. Cl.
CPC ......... *B01D 53/228* (2013.01); *B01D 61/246* (2013.01); *C10L 3/104* (2013.01); *B01D 2053/224* (2013.01); *B01D 2252/1035* (2013.01); *B01D 2252/204* (2013.01); *B01D 2256/24* (2013.01); *B01D 2256/245* (2013.01); *B01D 2257/504* (2013.01); *Y02C 10/06* (2013.01); *Y02C 10/10* (2013.01)

(58) Field of Classification Search
CPC ...... B01D 2053/224; B01D 2252/1035; B01D 2252/204; B01D 2256/24; B01D 2256/245; B01D 2257/504; Y02C 10/06; Y02C 10/10; C10L 3/104
See application file for complete search history.

(56) References Cited

U.S. PATENT DOCUMENTS

| | | | | |
|---|---|---|---|---|
| 5,643,799 | A * | 7/1997 | Atwater | B01D 53/22 422/82.02 |
| 6,228,145 | B1 * | 5/2001 | Falk-Pedersen | B01D 53/1475 95/44 |
| 2004/0057886 | A1 | 3/2004 | Paulsen et al. | |
| 2007/0006729 | A1 | 1/2007 | Mitariten | |
| 2008/0276803 | A1 | 11/2008 | Molaison et al. | |
| 2010/0024651 | A1 * | 2/2010 | Bansal | B01D 53/228 96/13 |
| 2011/0009684 | A1 | 1/2011 | Diaz et al. | |
| 2011/0290110 | A1 * | 12/2011 | Zhou | B01D 53/1475 95/45 |
| 2011/0290111 | A1 | 12/2011 | Dunne et al. | |
| 2012/0079852 | A1 * | 4/2012 | Northrop | C07C 7/005 62/620 |
| 2012/0111192 | A1 * | 5/2012 | Nazarko | B01D 53/1475 95/51 |
| 2012/0273417 | A1 * | 11/2012 | McGinnis | B01D 61/002 210/637 |
| 2012/0323059 | A1 * | 12/2012 | Liu | C10L 3/104 585/818 |
| 2014/0144321 | A1 | 5/2014 | Sawamura et al. | |

FOREIGN PATENT DOCUMENTS

| | | |
|---|---|---|
| JP | 2012-236134 A | 12/2012 |
| JP | 2012-236134 A | 12/2012 |
| WO | 2010/111996 A1 | 10/2010 |
| WO | 2010111996 | 10/2010 |

OTHER PUBLICATIONS

European Search Report dated Jan. 1, 2016 in related European Patent Application 13786917.8; 9 pages.
Eric Favre, Carbon Dioxide Recovery from Post-combustion Processes: Can Gas Permeation Membranes Compete with Absorption, Elsevier, Journal of Membrane Science 294 (2007), pp. 50-59.
Chinese Office Action dated Nov. 24, 2015 in related Chinese Patent Application 201380033118.8; 9 pages.
Chinese Office Action dated Jun. 15, 2016 in related Chinese Patent Application 201380033118.8; 10 pages.
Australian Examination Report dated Feb. 9, 2017 in related Australian Patent Application 2013260313; 3 pages.

* cited by examiner

METHOD AND SYSTEM FOR REMOVING CARBON DIOXIDE FROM HYDROCARBONS

RELATED APPLICATIONS

This application is a national stage application, under 35 U.S.C. § 371 of International Patent Application No. PCT/MY2013/000093, filed on May 8, 2013 and published as WO 2013/169093 on Nov. 14, 2013, which claims priority to Malaysian Patent Application No. PI 2012002024, filed on May 8, 2012, which is hereby incorporated by reference in its entirety.

TECHNICAL FIELD

The present invention relates to a method and a system for removing carbon dioxide from a hydrocarbon stream.

BACKGROUND

Natural gas is an important source of light hydrocarbon fuel comprising predominantly methane, and is increasingly used in place of conventional fuels due to its wide availability and relative ease of extraction compared to conventional fuels refined from crude oil. However, a lot of natural gas reservoirs contain a substantially high fraction of impurities, such as carbon dioxide ($CO_2$). Some natural gas reservoirs may contain $CO_2$ content of higher than 30%, for instance 50% to 60%, and up to 70%-90%. Other impurities may include compounds such as hydrogen sulfide ($H_2S$), nitrogen ($N_2$) and carbon monoxide (CO). In most reservoirs however, $CO_2$ usually forms the main impurity component of the extracted raw natural gas. Hence, there is a need to process the raw natural gas to remove the $CO_2$ before the natural gas can be efficiently employed for energy generation. Therefore, there have been numerous methods proposed in the art to remove $CO_2$ from a raw hydrocarbon stream such as natural gas.

One known method relates to a gas separation method wherein the raw natural gas is caused to flow through a membrane. As the different gaseous components in the natural gas will permeate the membrane at rates distinct from the permeation rate of methane, the raw natural gas stream becomes separated into a methane-rich stream and an impurity-rich stream. However, one drawback of such a method is that the primary driving force for the separation is the difference in partial pressure of the permeating component in the permeate stream and the retentate stream. As such, the efficiency of separation decreases with time as lesser impurities remain entrained in the natural gas stream. Furthermore, as some methane is expected to permeate through the membrane along with the impurities, there can be significant losses in methane yield of up to 20%. Yet another drawback of the gas separation technique is that impurities such as $CO_2$ are separated in gaseous form. Since acidic gases such as $CO_2$ and $H_2S$ cannot be discharged directly to the environment, there is a need to provide storage facilities for the $CO_2$, which usually requires a compression step to convert the gaseous $CO_2$ to a highly pressurized state for optimal storage. This compression step is energy intensive and results in high energy consumption and costs.

Another known method for removing $CO_2$ from hydrocarbons is gas scrubbing wherein the natural gas is contacted with a suitable absorbent medium in an absorption column, such as a packed-bed column. Typically, amine absorbents such as monoethanolamine (MEA), diethanolamine (DEA) methyldiethanolamine (MDEA), diisoproylamine (DIPA) are used because they readily absorb acidic gases such as $CO_2$. However, one of the drawbacks of gas scrubbing is that it requires the procurement of expensive amine absorbents and which require constant regeneration by stripping with high temperature gases (e.g. steam) to regenerate a lean-amine stream that is recycled back to the absorption column for further scrubbing. The regeneration process inevitably results in some amine loss and there is a need to periodically top up the amine absorbent. Furthermore, absorption columns are known to experience problems such as flooding, foaming and entrainment and are costly to install and maintain.

Therefore, there is a need to provide a method and a system for removing $CO_2$ from hydrocarbons that overcomes or at least ameliorates the disadvantages disclosed above. In particular, there is need to provide a method or system for producing a product natural gas stream having no more than 10%, preferably less than 5%, more preferably less than 3% carbon dioxide, from a feed stream containing high concentrations of $CO_2$, which overcomes or ameliorates the disadvantages provided above.

SUMMARY

In one aspect, there is provided a method for removing carbon dioxide from hydrocarbons, the method comprising the steps of: (a) contacting a feed stream comprising hydrocarbons and carbon dioxide with one or more gas-separation membranes to produce a hydrocarbon-rich retentate gas stream and a permeate gas stream rich in carbon dioxide, the retentate gas stream containing less carbon dioxide relative to the feed stream; and (b) passing at least one of the retentate gas stream or the permeate gas stream through an absorption unit to produce a hydrocarbon-rich gas phase and a liquid absorbent phase containing said carbon dioxide.

The feed stream may contain a majority amount of $CO_2$ relative to hydrocarbons. In one embodiment, the feed stream may contain up to 95% $CO_2$. In another embodiment, the feed stream may contain at least about 80% $CO_2$.

The hydrocarbons in the feed stream may contain light $C_1$-$C_4$ hydrocarbons, with a majority amount of methane (CH4) relative to other light hydrocarbons. In one embodiment, the feed stream may contain about 30% hydrocarbons, of which about 29% is $CH_4$ and the remaining 1% is $C_2$-$C_4$ hydrocarbons.

Advantageously, in the disclosed method, at least one of the effluent permeate or retentate streams separated out by the gas-separation membranes is further passed into an absorption unit, increasing the effectiveness of $CO_2$ removal from the natural gas while maintaining overall yield of $CH_4$.

In one embodiment of the disclosed method, the permeate gas stream, which is rich in $CO_2$ and low in pressure and $CH_4$ content, is brought into contact with a liquid absorbent. The permeate gas stream and the liquid absorbent may be separated by a permeable membrane to prevent direct mixing of the two phases. The $CO_2$ entrained within the permeate gas stream may be absorbed into the liquid absorbent and is removed from the permeate gas, resulting in the formation of a low pressure, methane rich gas phase. Advantageously, this low pressure, methane-rich gas phase may be employed as a utility gas and can be used to generate energy on-site. More advantageously, this absorption step is able to recover a substantial amount of $CH_4$ that co-permeated through the gas separation membrane along with the $CO_2$ during the upstream separation step, thereby increasing the overall yield of $CH_4$ in the product stream.

In an alternative embodiment of the disclosed method, the high pressure, methane-rich retentate gas stream is brought into contact with the liquid absorbent instead of the $CO_2$-rich permeate gas stream. One advantage of doing so is that it would allow the membrane separation step to be operated in a manner such that $CH_4$ loss due to permeation is minimized. In this configuration, while the retentate gas obtained from the gas separation step would contain significant quantities of $CO_2$, the entrained $CO_2$ can be effectively removed during the subsequent absorption step. For instance, in one embodiment, the first membrane separation step may be a single-stage membrane separation, where although less $CO_2$ is removed from the feed natural gas, there is advantageously reduced hydrocarbon loss due to its single stage configuration. This improves the overall $CH_4$ yield. Furthermore, as the effectiveness of gas separation decreases with the concentration of $CO_2$ remaining in the natural gas feed, having a single stage gas separation step also serves to optimize $CO_2$ removal as the gas separation unit can be designed to be smaller (minimizing unit footprint) and utilize less energy (cost savings).

In another aspect, there is provided a system for removing carbon dioxide from hydrocarbons, said system comprising: (a) one or more gas separation units configured to receive a feed stream comprising hydrocarbons and carbon dioxide, wherein the gas separation unit is configured to produce a hydrocarbon-rich retentate gas stream and a permeate gas stream rich in carbon dioxide; and (b) one or more absorption units located downstream of said gas separation units, the absorption units configured to receive at least one of the retentate gas stream or the permeate gas stream, and wherein the absorption units are configured to produce a hydrocarbon-rich gas phase and a liquid absorbent phase containing carbon dioxide.

The feed stream may comprise a majority amount of $CO_2$ relative to the hydrocarbons. In one embodiment, the feed stream may contain up to 95% $CO_2$ relative to hydrocarbons.

The hydrocarbons in the feed stream may contain light $C_1$-$C_4$ hydrocarbons, with a majority amount of methane ($CH_4$) relative to other light hydrocarbons.

Advantageously, the disclosed system couples the gas separation unit with a membrane contactor unit located downstream, which greatly increases the overall yield of $CH_4$ and enhances the effectiveness of $CO_2$ removal. In another advantageous aspect of the present invention, the disclosed system provides flexibility in design by configuring the membrane contactor unit to receive at least one of the permeate effluent or the retentate effluent exiting the gas separation unit. As discussed with reference to the above-mentioned method, this flexibility allows the design of the gas separation to assume either single-stage or multi-stage configurations to balance an operator's needs for minimizing system footprint, optimal $CO_2$ removal and while concurrently maximizing $CH_4$ yield.

DEFINITIONS

The following words and terms used herein shall have the meaning indicated:

The "% $CO_2$" as used in the context of the present specification, will refer to mol % unless stated otherwise.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

BRIEF DESCRIPTION OF DRAWINGS

The accompanying drawings illustrate disclosed embodiments and serves to explain the principles of the disclosed embodiments. It is to be understood, however, that the drawings are designed for purposes of illustration only, and not as a definition of the limits of the invention.

DETAILED DESCRIPTION OF DRAWINGS

Figure 1:
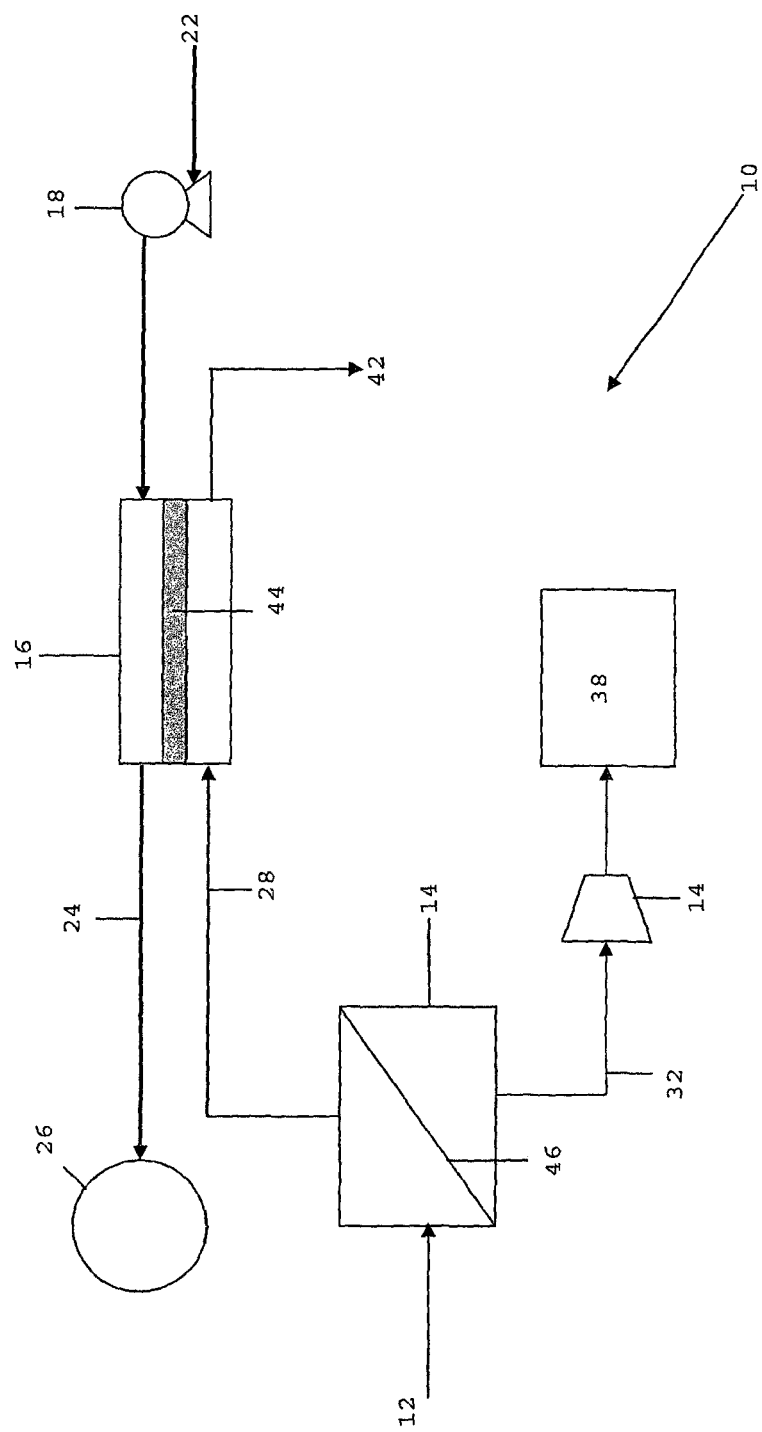
FIG. 1 is a schematic diagram showing a simplified process flow of a first embodiment of the disclosed system for processing natural gas.

Referring to FIG. 1, there is shown an exemplary embodiment of the disclosed system 10 in a simplified process flow diagram.

Raw natural gas feed 12 comprising methane gas ($CH_4$) and a majority concentration (up to 95%) of carbon dioxide ($CO_2$) is first routed from a natural gas pre-treatment unit or directly from the raw natural gas source and transmitted at high pressures towards a membrane separator unit 14. The raw natural gas feed 12 may be transmitted at a pressure ranging from about 20 bars to about 70 bars.

Membrane separator unit 14 comprises one or more sheets of separation membrane 46 arranged in a spiral wound configuration or a plurality of hollow fiber membranes arranged in a bundle configuration. The high pressure, natural gas feed 12 is passed through the "shell" side of the separation membrane 46. As $CO_2$ is more permeable to the membrane 46 relative to $CH_4$, a high pressure, retentate stream 28 forms within the "shell" side and which becomes concentrated with $CH_4$. Conversely, the "lumen" side of the membrane forms a low pressure, permeate stream 32 which becomes concentrated with $CO_2$. The permeate stream 32 typically is at lower pressures of from about 1 bar to about 30 bars. At this stage, the retentate stream 28 exiting the membrane separator unit 14 contains less $CO_2$ relative to the raw natural gas feed 12, and typically in the range of about 20% to 40%.

The low pressure, permeate stream 32 exiting the membrane separator unit 14 may be passed through a compressor 34 to be re-pressurized for optimized storage in a storage unit 38. Alternatively, the permeate stream may be passed to post-processing units for sequestration of the $CO_2$.

The high pressure, retentate stream 28 is subsequently passed towards a membrane contactor unit 16. Membrane contactor unit 16 comprises at least one membrane 44 disposed within the contactor and which partitions the membrane contactor unit to form at least one gas flow region and at least one liquid flow region. More than one membrane 44 can be provided within the membrane contactor unit 16, for example, a plurality of membranes 44 can be provided in a hollow fiber bundle configuration.

Membrane contactor unit 16 is configured to receive an incoming liquid absorbent stream 22 into its liquid flow region. Liquid absorbent stream 22 is selected to be any liquid medium that exhibits preferential affinity towards $CO_2$ and which does not wet the membrane 44 readily. In one embodiment, the liquid absorbent 22 is sea water. However, other liquid absorbents are also contemplated within the scope of the disclosed system, including amine absorbents such as MEA, MDEA, and DEA. However, sea water is presently preferred due to its availability and negligible costs. The liquid absorbent stream 22 is routed to the membrane contactor unit 16 via a pump system 18.

Membrane contactor unit 16 is further configured to receive the retentate stream 28 into its gas flow region. In this embodiment, the gas flow and the liquid absorbent flow are arranged countercurrent to each other but cross-flow and co-current flow configurations are also within the scope of the disclosed system 10. Typically, a hydrophobic, microporous membrane, such as but not limited to, polypropylene (PP), polytetrafluoroethylene (PTFE), polyvinylidene fluoride (PVDF), polysulfone (PSf), polyethylenimine (PEI) membranes, is selected to form the permeable barrier between the gas and liquid flow regions. The pore size of the membrane may be in a range from 0.01 μm to about 4 μm. In one embodiment, the pore size of the membrane is selected such that it can be readily filled up by $CO_2$ molecules to maximize surface area for absorption of $CO_2$ into the liquid absorbent 22. The $CO_2$ entrained within the retentate stream 28 dissolves into the adjacent liquid absorbent stream 22, forming an effluent liquid stream 24 containing high concentrations of $CO_2$. The effluent liquid stream 24 exits the contactor unit 16 and is passed to a treatment unit 26 for treatment/processing.

The effluent gas stream 42 exiting the contactor unit 16 is a high pressure gas rich in $CH_4$ and contains little or negligible amounts of $CO_2$. In one embodiment, the effluent gas stream 42 contains less than 10%, preferably less than 5%, even more preferably, less than 3% CO2. The $CO_2$ concentration in the effluent gas stream 42 may be suitably varied to meet the sales gas specification.

One advantage of this configuration is that a single-stage membrane separation can be used for membrane separator unit 14. This minimizes overall hydrocarbon loss as it is expected that at least a portion of $CH_4$ will also permeate through membrane 46 to form part of the permeate stream (although at a slower rate than $CO_2$.) By having a single-stage membrane separation unit, the $CH_4$ loss can be minimized with a trade-off that some $CO_2$ will remain entrained within the retentate stream 28. Advantageously, by coupling the membrane separation unit with a contactor unit 16 downstream, the entrained $CO_2$ can still be effectively removed such that the effluent gas stream 42 attains a desired $CO_2$ concentration. Furthermore, as the retentate stream 28 has already undergone a first-pass separation, the absorption load of the membrane contactor unit 16 is advantageously reduced. Finally, by utilizing sea water as the liquid absorbent, the disclosed system 10 is highly cost-effective due to the availability of sea water and further does not require installation of separate amine-regeneration units. In another embodiment, the liquid absorbent may be distilled water. In yet another embodiment, the liquid absorbent may be water containing additives that serve to improve $CO_2$ absorption.

Figure 2:
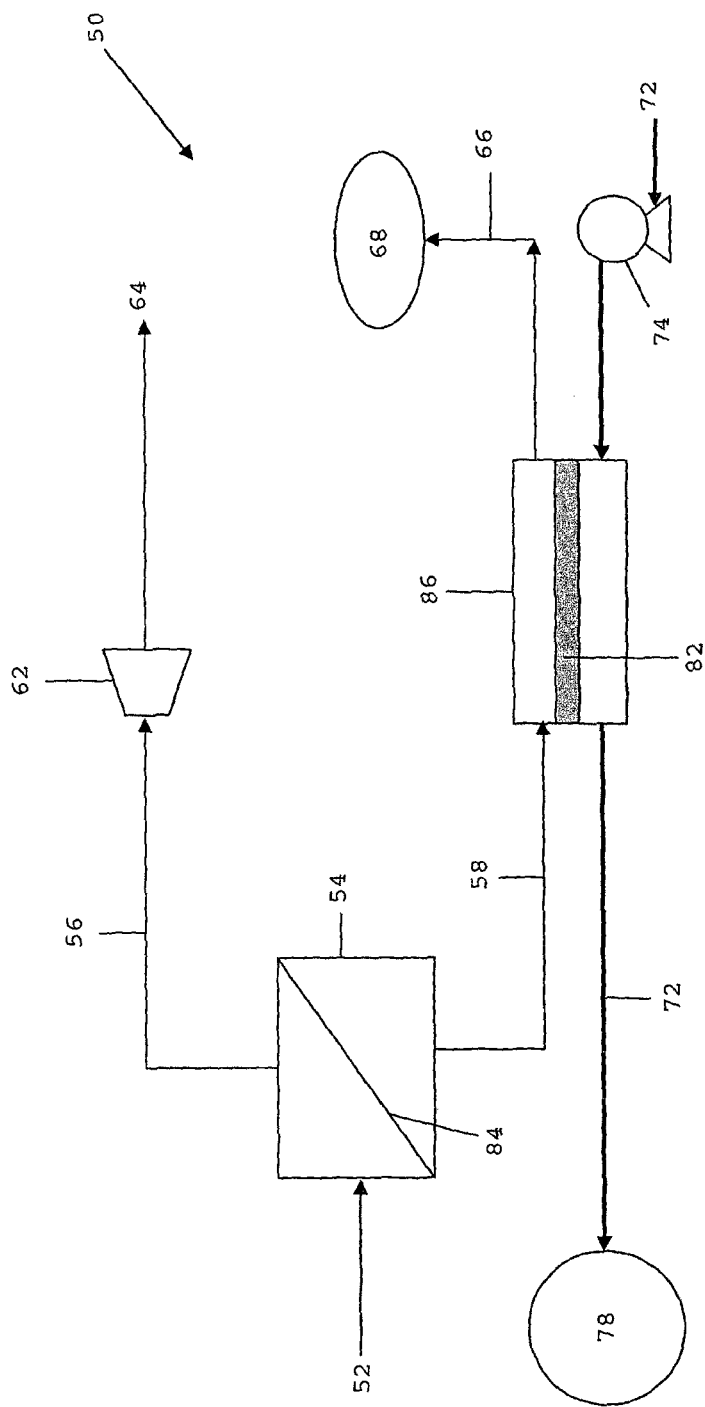
FIG. 2 is a schematic diagram showing a simplified process flow of a second embodiment of the disclosed system, wherein the permeate exiting the membrane separator is routed towards the membrane contactor instead of the retentate stream.

Now referring to FIG. 2, there is shown an alternative embodiment of a system 50 for processing natural gas according to the present invention. In this embodiment, a high pressure, raw natural gas feed 52 is passed through a membrane separation unit 54 to form a $CH_4$-rich retentate stream 56 and a $CO_2$-rich permeate stream 58. In this embodiment, the membrane separation unit 54 may comprise a plurality of membrane modules 84 and is suitably configured for multi-stage membrane gas separation. For instance, the membrane modules 84 disposed within the membrane separation unit 54 may be arranged in a cascaded configuration such that the natural gas feed 52 has to undergo two or more stages of gas separation. It would be apparent that the number of cascades and stages can be suitably selected such that the retentate stream 56 contains an acceptable concentration of $CO_2$ to meet sales or consumption requirements. In one embodiment, the number of membrane modules 84 is selected such that retentate stream 56 contains less than or equal to about 10% of $CO_2$. The retentate stream 56 may be pressurized by passing through a compressor 62 and sold directly as sales gas 64.

Due to the multi-stage separation performed upstream, a significant fraction (up to 15%) of the $CH_4$ in the natural gas feed 52 may be lost to the permeate stream 58. As a result, the permeate stream 58 still contains a significant quantity of the product hydrocarbon $CH_4$. Accordingly, permeate stream 58 is thereafter sent to an membrane-contactor unit 86, whereby it is configured to flow counter-current to an adjacent liquid absorbent stream 72 separated by a permeable membrane 82. Other flow configurations such as cross-flow or co-current flow are also utilized in the membrane contactor unit 86. The permeable membrane 82 partitions the membrane contactor unit 86 to define a region of gas flow and a region of liquid flow. It is to be understood that more than one membrane 82 may be provided within the absorption unit 86. The membranes 82 may be provided as one or more bundles of hollow fiber membranes or as cascaded sheet-membranes disposed within the absorption unit.

After most of the remaining $CO_2$ in the permeate stream 58 has been absorbed into the liquid absorbent 72, a low pressure, effluent gas stream 66 is formed which contains substantially $CH_4$ and a low concentration of $CO_2$. In one embodiment, the effluent gas stream 66 contains no more than 10% $CO_2$. Effluent gas stream 66 is typically at about 1 to 30 bars. Advantageously, most of the $CH_4$ lost as permeate in the membrane separation unit 54 can be recovered by the membrane contactor unit 86 as effluent gas stream 66. Further advantageously, the effluent gas stream 66 can be directly utilized as utility gas to generate energy on-site, which reduces the external energy consumption of the disclosed system. The liquid absorbent exiting the membrane contactor unit 86 as liquid effluent stream 76 is rich in $CO_2$ and may be sent directly to storage 78 in the liquid phase. Alternatively, the liquid effluent stream 76 may be passed to post-treatment units for sequestration of the $CO_2$ contained therein. Advantageously, the absorbed $CO_2$, being in liquid form, is easy to transport and does not require costly compression steps to render the $CO_2$ storage-friendly.

Disclosure of Optional Embodiments

Exemplary, non-limiting embodiments of the above method for producing natural gas according to the first aspect will now be disclosed.

In the disclosed method, either the retentate gas stream or the permeate gas stream or both may be further subjected to an absorption step to remove $CO_2$ contained within those streams. In a preferred embodiment, only the retentate gas stream is subjected to absorption with a liquid absorbent. In yet another embodiment, only the permeate gas stream is further subjected to absorption with a liquid absorbent.

The contacting step (a) may further comprise a step of selecting a gas-separation membrane that is more permeable to $CO_2$ relative to $CH_4$. The gas separation membrane may be provided in a spiral wound configuration or as a bundle of hollow fibers disposed within a membrane separator unit. In one embodiment, the gas separation membrane is made of cellulose acetate. Other suitable gas separation membranes may be selected from the group including, but are not limited to, polysulfone, polyethylenimine, and polyamide/polimide copolymer membranes. In another embodiment, the gas separation membrane may be a polyamide/polyimide co-polymer membrane. An example of such polyamide/polyimide co-polymer membranes would be the commercially available Torlon® membranes.

The contacting step (a) may comprise a single stage, dual-stage or multi-stage gas separation step wherein the feed natural gas stream is flowed through the tube side (or "lumen" side) of the gas separation membrane and wherein at least a fraction of the $CO_2$ present within the feed natural gas stream permeates through the membrane into the "shell" side to form a low pressure permeate gas stream or vice versa. In this respect, the pressure of the permeate gas stream may be from about 1 bar to about 30 bars Where the contacting step (a) is a single stage membrane separation step, the $CO_2$ concentration in the retentate stream may be in a range of about 20% to about 40%. Where the contacting step (a) comprises dual or multi-stage membrane separation, the $CO_2$ concentration in the retentate stream may be in a range of from about 20% to about 10%. Additionally, the pressure of the retentate stream may be from about 20 bars to about 100 bars The passing step (b) may comprise providing at least one permeable membrane disposed within the absorption unit to define at least one gas flow region and at least one liquid flow region. In one embodiment, the absorption unit may be a membrane contactor unit.

The permeable membrane may be composed of a substantially microporous and hydrophobic polymer material. The polymer material of the permeable membrane may be selected from the group consisting of, polypropylene, polyvinylidene fluoride, polytetrafluoroethylene, polysulfone, polyethylenimide, polyamide/polyimide, cellulose acetate or co-polymers thereof. More than one membrane may be provided within the absorption unit in a spiral wound, cascade sheet or hollow fiber configuration. Each membrane may be made of the same or different polymer material. Preferably, the selected membrane should exhibit a large surface area and should be substantially compatible with the liquid absorbent to minimize membrane fouling or wetting. In one embodiment, the permeable membrane is a PVDF membrane The passing step (b) may further comprise passing either one of the retentate gas stream or the permeate gas stream along the gas flow region of the absorption unit. The passing step (b) may further comprise passing a liquid absorbent along the liquid flow region adjacent to the gas flow region, during which the $CO_2$ contained in the retentate gas or permeate gas is absorbed into the liquid absorbent through the pores of the permeable membrane. In one embodiment, the liquid absorbent stream and the adjacent gas stream may be passed counter-current with respect to each other to generate maximal partial pressure difference of $CO_2$ between the two phases. Advantageously, this improves the mass transfer of $CO_2$ into the liquid absorbent. In another embodiment, the liquid absorbent stream may be passed in a co-current configuration with respect to the gas stream.

The passing step (b) may further comprise a step of providing a liquid absorbent that is capable of absorbing $CO_2$ and which is substantially inert to the membrane material. In one embodiment, the liquid absorbent is sea water. Advantageously, using sea water as the liquid absorbent is cost-effective due to its wide availability and negligible costs.

In one embodiment, the retentate stream obtained directly from the contacting step (a) may contain less than or equal to 10% $CO_2$, preferably less than 5%, even more preferably less than 3% $CO_2$. Where the retentate stream obtained directly from the contacting step (a) contains less than 10% $CO_2$, the contacting step (a) may comprise a multi-stage gas separation step.

In another embodiment, the methane-rich gas phase obtained directly from the passing step (b) may contain less than or equal to 10% $CO_2$, preferably less than 5%, even more preferably less than 3% $CO_2$.

In one embodiment, where the retentate gas stream is subjected to passing step (b), the methane-rich gas phase may be pressurized, having pressures in the range of about 20 bars to about 100 bars. In another embodiment, where the permeate gas stream is subjected to passing step (b), the methane-rich gas phase may have a low pressure, in the range of about 1 bar to about 30 bars Exemplary, non-limiting embodiments of the system for producing natural gas according to the second aspect will now be disclosed.

In the disclosed system, the absorption units may be configured to receive at least one of the retentate gas stream or the permeate gas stream exiting the gas separation unit. In one embodiment, absorption units may be provided downstream of both the retentate gas stream and permeate gas stream. In another embodiment, absorption units are provided downstream to only receive the retentate gas stream. In yet another embodiment, absorption units are provided downstream to only receive the permeate gas stream.

In the disclosed system, the gas separation unit may comprise one or more membranes modules coupled to each other in series or parallel arrangement or a combination thereof. Each membrane module may comprise one or more dense membranes disposed within the modules arranged in a spiral wound or hollow fiber configuration. Each dense membrane may be made of the same or different material. The dense membrane may be composed of a material that allows $CO_2$ to permeate faster through the membrane relative to $CH_4$. In one embodiment, the dense membrane is a cellulose acetate membrane. Other possible membranes are as discussed above.

The absorption units may comprise one or more membrane contactor units. Each membrane contactor comprises a permeable membrane disposed within said contactor to thereby define a region for gas flow and an adjacent region for liquid flow, wherein the gas flow region and liquid flow region are separated by the permeable membrane. The membrane contactor unit may be configured to receive the retentate gas stream or permeate gas stream exiting the gas separation units into the gas flow region. The membrane contactor unit may be configured to receive a liquid absorbent stream into the liquid flow region. In one embodiment, the membrane contactor unit is configured to flow a stream of liquid absorbent adjacent to either the permeate gas stream or the retentate gas stream. In a preferred embodiment, the membrane contactor is configured such that the gas flow and liquid absorbent flow are counter-current with respect to each other. In yet another embodiment, the membrane contactor is configured such that the gas flow and liquid absorbent flow are in a co-current manner.

The permeable membrane in the contactor unit may be substantially hydrophobic. In one embodiment, the permeable membrane may be composed of a substantially microporous and hydrophobic polymer material. The polymer material of the permeable membrane may be selected from the group consisting of, polypropylene, polyvinylidene fluoride, polytetrafluoroethylene, polysulfone, polyethylenimide or co-polymers thereof.

In one embodiment of the disclosed system, the gas separation unit is configured to produce a retentate gas stream that contains less than or equal to 10% $CO_2$, more preferably less than 5% $CO_2$, even more preferably less than 3% $CO_2$. In this embodiment, it is envisioned that the separation unit will comprise a plurality of membrane modules arranged in stages to effect multi-stage gas separation. In this embodiment, the low pressure permeate gas stream may be routed to one or more absorption units to recover a low pressure, methane-rich gas phase exiting the absorption unit. This low pressure methane-rich gas phase may contain less than or equal to 10% $CO_2$, preferably less than 5% and more preferably less than 3% $CO_2$.

In another embodiment, the gas separation unit is configured to produce a retentate gas that contains about 20% to 30% $CO_2$. In this embodiment, the retentate gas stream is subsequently passed through one or more absorption units in order to produce a high pressure, methane-rich gas phase. This high pressure, methane-rich gas phase may contain less than or equal to 10% CO2, preferably less than 5% CO2 and more preferably less than 3% $CO_2$. In this embodiment, the separation unit may only comprise a single membrane module configured for a single-stage gas separation.

Applications

The above disclosure provides an efficient, flexible and cost-effective method and system for removing $CO_2$ from high-$CO_2$ concentration hydrocarbon streams, while overcoming the known technical problems in the state of the art. For instance, the combination of one or more gas separation units with one or more downstream absorption units substantially reduces or negates hydrocarbon loss during the separation procedure, thereby improving the yield of $CH_4$ for the overall method and system. Furthermore, the use of membrane contactor units as the absorption units further obviates known technical problems associated with absorption columns as the gas and liquid phases do not mix directly.

Even more advantageously, the present disclosure provides a flexible and customizable method and system wherein the system may be operated to produce substantially low $CO_2$ content natural gas directly after an initial gas separation process with a trade-off that more hydrocarbon loss will be experienced during gas separation (but which is recoverable via a downstream absorption step). In the alternative, the system may be operated to minimize hydrocarbon loss in the initial gas separation step with the trade-off that more $CO_2$ will remain entrained in the retentate gas, which is to be removed during a further absorption step in a membrane contactor unit. Such flexibility is undoubtedly useful in plant design where space constraints and energy considerations necessarily affect the mode of operation chosen for the natural-gas production system.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method for removing carbon dioxide from hydrocarbons, the method comprising the steps of:
   (a) contacting a feed stream comprising hydrocarbons and carbon dioxide with one or more gas-separation membranes to produce a hydrocarbon-rich retentate gas stream and a permeate gas stream rich in carbon dioxide, said retentate gas stream containing less carbon dioxide relative to said feed stream; and
   (b) passing at least one of said retentate gas stream or said permeate gas stream through an absorption unit to produce a hydrocarbon-rich gas phase and a liquid absorbent phase containing said carbon dioxide, wherein said passing step (b) comprises providing a permeable membrane within said absorption unit to thereby define a gas flow region and a liquid flow region separated by said permeable membrane,
   wherein the liquid absorbent is sea water.

2. The method according to claim 1, wherein said feed stream comprises a major amount of carbon dioxide relative to said hydrocarbons.

3. The method according to claim 2, wherein said feed stream comprises up to 95% $CO_2$, relative to said hydrocarbons.

4. The method according to claim 1, wherein said passing step (b) further comprises passing at least one of said retentate gas stream or said permeate gas stream along said gas flow region, adjacent to a liquid absorbent stream flowing in said liquid flow region.

5. The method according to claim 4, wherein said passing step (b) further comprises flowing said liquid absorbent adjacent to said retentate gas stream or said permeate gas stream to at least partially absorb carbon dioxide contained in said gas streams into said liquid absorbent.

6. The method according to claim 5, wherein said passing step (b) further comprises flowing said liquid absorbent and said retentate gas stream or said permeate gas stream in a counter-current configuration.

7. The method of claim 1, further comprising selecting said one or more gas-separation membranes to be more permeable to carbon dioxide relative to methane.

8. A system for removing carbon dioxide from hydrocarbons, said system comprising:

(a) one or more gas separation units configured to receive a feed stream comprising hydrocarbons and carbon dioxide wherein said gas separation unit is configured to produce a hydrocarbon-rich retentate gas stream and a permeate gas stream rich in carbon dioxide; and (b) one or more absorption units located downstream of said gas separation units, said absorption units configured to receive at least one of said retentate gas stream or said permeate gas stream, wherein said absorption units are configured to produce a hydrocarbon-rich gas phase and a liquid absorbent phase containing carbon dioxide, and wherein said one or more absorption units comprises one or more membrane contactor units, wherein the liquid absorbent is water.

9. The system according to claim 8, wherein said one or more membrane contactor units comprises at least one permeable membrane disposed therein to thereby define a liquid flow region and a gas flow region separated by said permeable membrane.

10. The system according to claim 9, wherein said one or more membrane contactor units is configured to flow a stream of a liquid absorbent in said liquid flow region, adjacent to said retentate gas stream or said permeate gas stream passing through said flow region.

11. The system according to claim 10, wherein said one or more membrane contactor units is configured to flow said liquid absorbent and said retentate gas stream or said permeate gas stream in a counter-current configuration.

12. The system according to claim 9, wherein said at least one permeable membrane is substantially hydrophobic.

13. The system according to claim 8, wherein said one or more gas separation units comprises one or more dense membranes.

14. The system according to claim 13, wherein said one or more dense membranes is arranged in a spiral wound or hollow fiber configuration.

15. The system according to claim 13, wherein said one or more dense membranes is more permeable to $CO_2$ relative to $CH_4$.

16. The system according to claim 15, wherein said one or more dense membranes is composed of materials selected from the group of cellulose acetate, polysulfone, polyethylenimine, polyamide/polyimide copolymers, and copolymers thereof.

17. The system according to claim 8, wherein said retentate gas stream exiting said one or more gas separation units or said hydrocarbon-rich gas phase exiting said one or more absorption units contains less than 10% carbon dioxide.

18. The system according to claim 8, wherein said retentate gas stream exiting said one or more gas separation units or said hydrocarbon-rich gas phase exiting said one or more absorption units contains at least less than 5% carbon dioxide.

* * * * *